(12) United States Patent
Okuyama et al.

(10) Patent No.: US 6,674,029 B2
(45) Date of Patent: Jan. 6, 2004

(54) POSITION-DETECTING APPARATUS (75) Inventors: Tomoyuki Okuyama, Toride (JP);
Mitsuhiro Saitoh, Koshigaya (JP);
Ryosuke Takeuchi, Funabashi (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/166,699

(22) Filed: Jun. 12, 2002

(65) Prior Publication Data
US 2002/0185362 A1 Dec. 12, 2002

(30) Foreign Application Priority Data
Jun. 12, 2001 (JP) ........................................ 2001-177635

(51) Int. Cl.⁷ .............................................. H01H 35/26
(52) U.S. Cl. ...................... 200/81.4; 200/195; 200/187; 200/188; 200/191
(58) Field of Search ................................ 200/81.4, 195, 200/187, 188, 191

(56) References Cited
FOREIGN PATENT DOCUMENTS

| JP | 4-57708 | 5/1992 |
| JP | 2000-141166 | * 5/2000 |

OTHER PUBLICATIONS

English language summary included for JP 2000–141166, and relevance of this citation is discussed in the present specification, page 1.

English translation of relevant portions of JP 4–57708 is included.

* cited by examiner

*Primary Examiner*—Elvin Enad
*Assistant Examiner*—Jennifer A. Poker
(74) *Attorney, Agent, or Firm*—Paul A. Guss (57) ABSTRACT

Each of pressure-detecting switches to be connected to one another has a first connector provided at one side section and a first connector provided at the other side section. Electric wiring is mutually effected for the pressure-detecting switches by attaching/detaching the first connectors. The pressure-detecting switches are mutually fixed by using a fixing mechanism arranged for the side sections to effect the function for mutually attaching/detaching the pressure-detecting switches.

6 Claims, 6 Drawing Sheets

POSITION-DETECTING APPARATUS

BACKGROUND OF THE INVENTION

1. Field of the Invention

The present invention relates to a position-detecting apparatus including a plurality of pressure-detecting switches having a detecting nozzle for jetting a fluid supplied from a fluid supply source to a detecting passage toward an object and controlling a flow rate of a fluid supplied from the fluid supply source to a comparing passage, thereby detecting whether or not a pressure in the detecting passage arrives at a prescribed pressure in the comparing passage.

2. Description of the Related Art

A position-detecting apparatus is generally used in order to detect whether or not a workpiece is correctly seated on a seat surface by utilizing the nozzle back pressure. Japanese Laid-Open Patent Publication No. 2000-141166, for example, discloses such a position-detecting apparatus.

Figure 6:
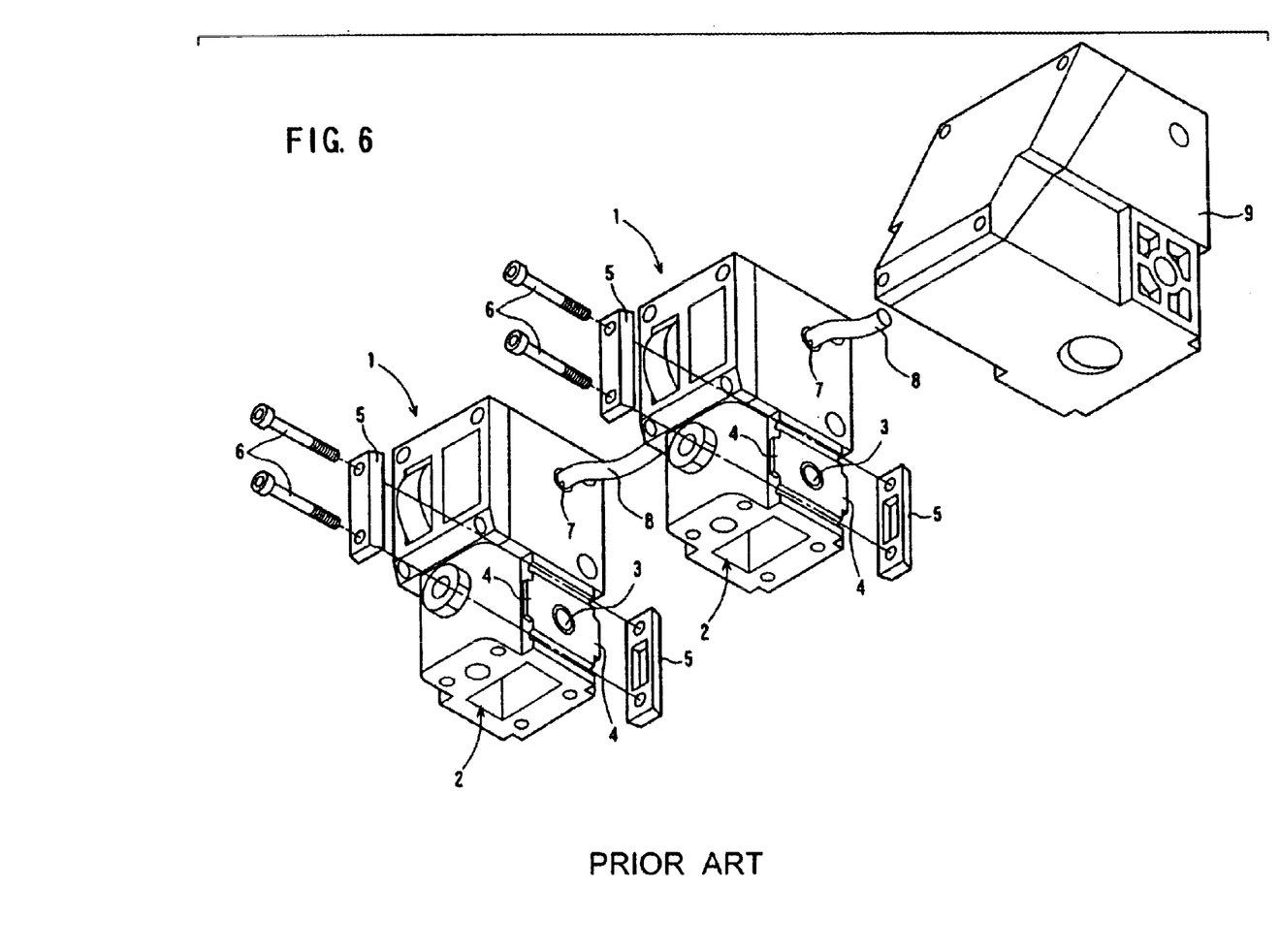
FIG. 6 is an exploded perspective view illustrating a conventional position-detecting apparatus.

As shown in FIG. 6, each of pressure-detecting switches of the position-detecting apparatus comprises a casing 1 and a passage block 2 which are assembled in an integrated manner. Although not shown, a diaphragm and a proximity switch operated by the diaphragm are accommodated in the casing 1. A comparing passage and a detecting passage (not shown), through which the air introduced from a supply port 3 flows in a branched manner while the air is supplied to the diaphragm, are formed in the passage block 2.

Projecting tab plates 4, which protrude in the direction perpendicular to the connecting direction, are formed for the passage block 2. Joiners 5 are integrally installed in a state in which the respective projecting tab plates 4 of the passage blocks 2 to be connected to one another are opposed to one another. The joiners 5 are fastened and fixed to the passage blocks 2 by using bolts 6.

A lead wire-drawing port 7 is formed through a side surface on the connecting side of the casing 1. A lead wire 8 for an electric part such as the proximity switch is drawn from the lead wire-drawing port 7. The lead wires 8 are accumulated in a terminal box 9.

However, conventionally, it is necessary to perform the following wiring operation. That is, the lead wire 8 of each of the casings 1 is introduced into the terminal box 9 through the interior of the adjoining casing 1, and the lead wire 8 is connected to the terminal box 9. Therefore, when the plurality of pressure-detecting switches are connected, or when the pressure-detecting switch is detached, then it is necessary that the other casing 1 adjoining the casing 1 is attached/detached in addition to the casing 1 which is required to be exchanged. As a result, the operation is considerably complicated.

Further, the terminal box 9 can be connected to only one end of each of the plurality of pressure-detecting switches to be connected. Therefore, the place of installation of the entire position-detecting apparatus and the posture of installation are limited. The conventional position-detecting apparatus is inferior in versatile performance.

SUMMARY OF THE INVENTION

A general object of the present invention is to provide a position-detecting apparatus which makes it possible to easily and quickly perform the operation for attaching/detaching pressure-detecting switches to be connected to one another.

A principal object of the present invention is to provide a position-detecting apparatus which can be arranged at a variety of places of installation with ease and which is excellent in versatile performance.

According to the present invention, when pressure-detecting switches are mutually attached/detached, it is enough that only first connectors for electric wiring are mutually attached/detached. When the pressure-detecting switch and a terminal board box are attached/detached, it is enough that only first and second connectors for electric wiring are attached/detached. Therefore, it is possible to perform the operation for attaching/detaching the position-detecting apparatus easily and quickly.

Further, according to the present invention, the pressure-detecting switches can be connected to both side sections of the terminal board box with ease. Accordingly, the terminal board box can be arranged at an arbitrary position. The degree of freedom of the installation of the entire position-detecting apparatus is effectively improved. Further, it is possible to apply individual supply pressures to the pressure-detecting switches which are connected to both sides of the terminal board box.

Further, according to the present invention, the first connectors for electric wiring are arranged in openings which are provided at both side sections of the pressure-detecting switch. A projection, which is formed at one side section, is inserted and fitted into the opening which is provided at the other side section. Accordingly, the first connectors for electric wiring can be mutually attached/detached easily and reliably. It is possible to efficiently perform the operation for attaching/detaching the pressure-detecting switch.

Further, according to the present invention, the pressure-detecting switches are connected to one another with a fixing fixture which is arranged for the side sections to be connected to one another. Therefore, the operation for attaching/detaching the pressure-detecting switch is effectively simplified, for example, as compared with a case in which a connecting through bolt is used.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
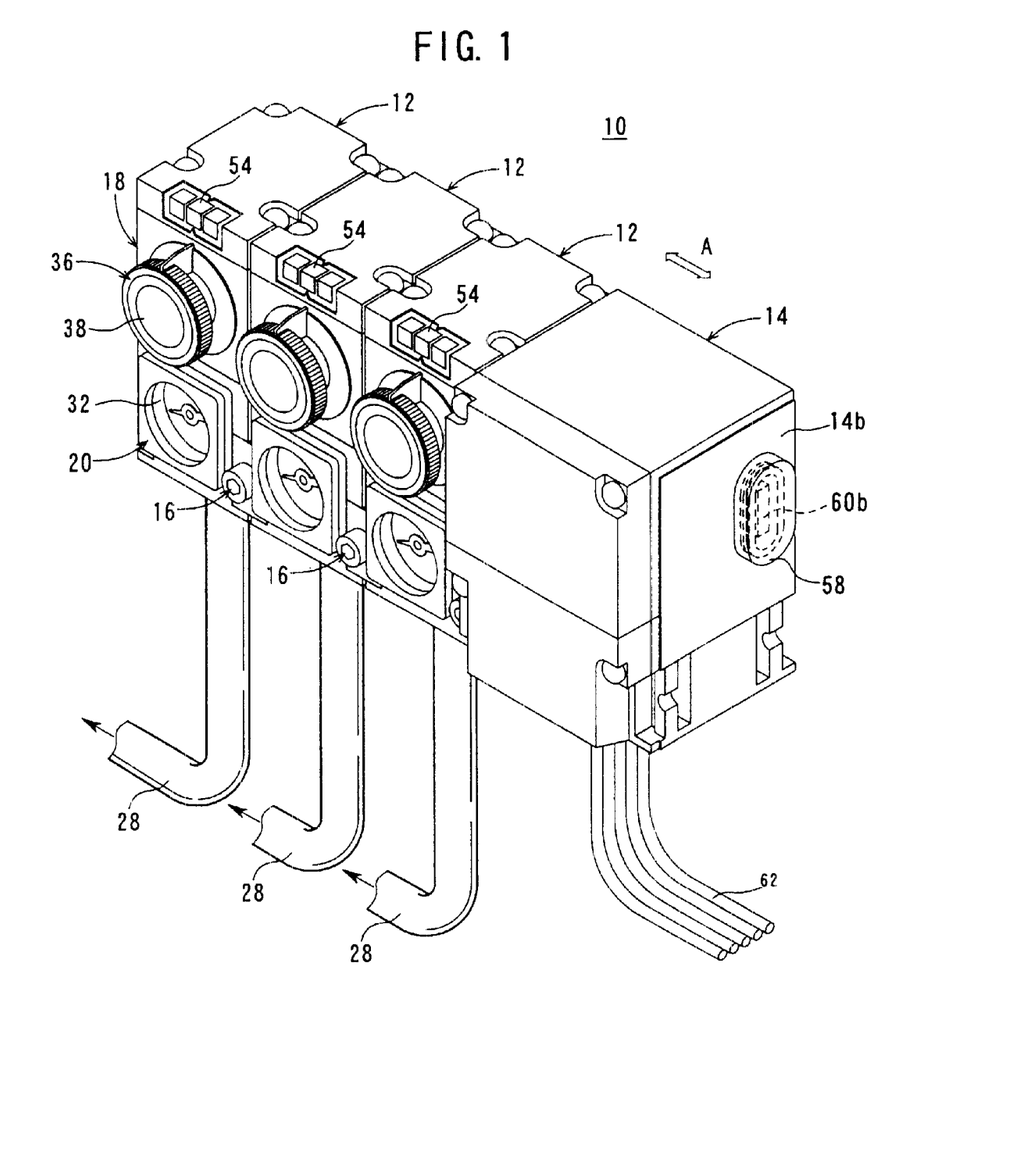
FIG. 1 is a schematic perspective view depicting a position-detecting apparatus according to an embodiment of the present invention.

With reference to FIG. 1, reference numeral 10 indicates a position-detecting apparatus according to an embodiment of the present invention.

The position-detecting apparatus 10 comprises a plurality of, for example, three of pressure-detecting switches 12 which are connected to one another in the direction of the arrow A, a terminal board box 14 which is connectable to the other end of the pressure-detecting switch 12 in the stacking direction, and fixing mechanisms 16 which connect the pressure-detecting switches 12 to one another.

As shown in FIGS. 1 to 4, the pressure-detecting switch 12 comprises a casing section 18 and a passage block section 20 to be mutually connected. A supply passage 24, which is communicated with an air supply source (fluid supply source) 22, is formed for the passage block section 20 penetratingly in the connecting direction (direction of the arrow A, see FIGS. 2 to 5).

Figure 5:
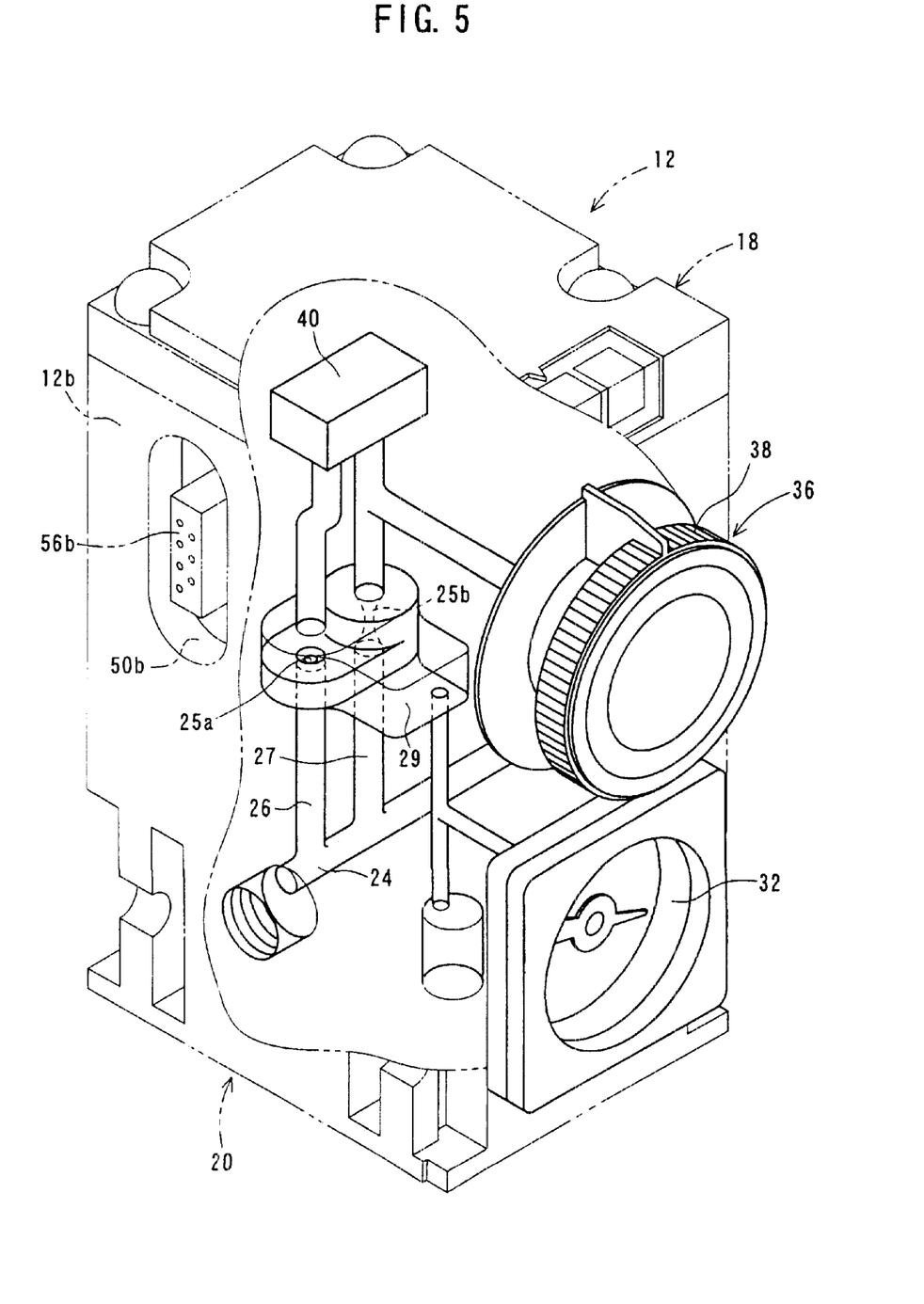
FIG. 5 is a perspective view depicting a fluid circuit of the pressure-detecting switch.

As shown in FIG. 5, the supply passage 24 is branched into a detecting fluid passage 26 and a comparing fluid passage 27. The detecting fluid passage 26 and the comparing fluid passage 27 are communicated with disk-shaped fixed throttles 25a, 25b respectively. The detecting fluid passage 26 is communicated with a detecting nozzle 30 from an opening 29 via a tube 28 (see FIGS. 2 and 4). A pressure gauge 32 is communicated with an intermediate portion of the detecting fluid passage 26. The pressure gauge 32 is arranged in a recess 34 which is formed for the passage block section 20 (see FIG. 4).

The comparing fluid passage 27 has a prescribed pressure-setting section 36 which is capable of setting a prescribed pressure by controlling the flow rate of air. The prescribed pressure-setting section 36 has a setting handle 38. The setting handle 38 is arranged on the side of the casing section 18 so that the setting handle 38 is operable from the outside.

A semiconductor pressure sensor 40 is incorporated into the casing section 18 (see FIG. 5). The semiconductor pressure sensor 40 compares the nozzle back pressure obtained when the air is jetted from the detecting nozzle 30 against a workpiece W with the prescribed pressure generated in the prescribed pressure-setting section 36 to detect whether or not the nozzle back pressure arrives at the prescribed pressure.

Figure 3:
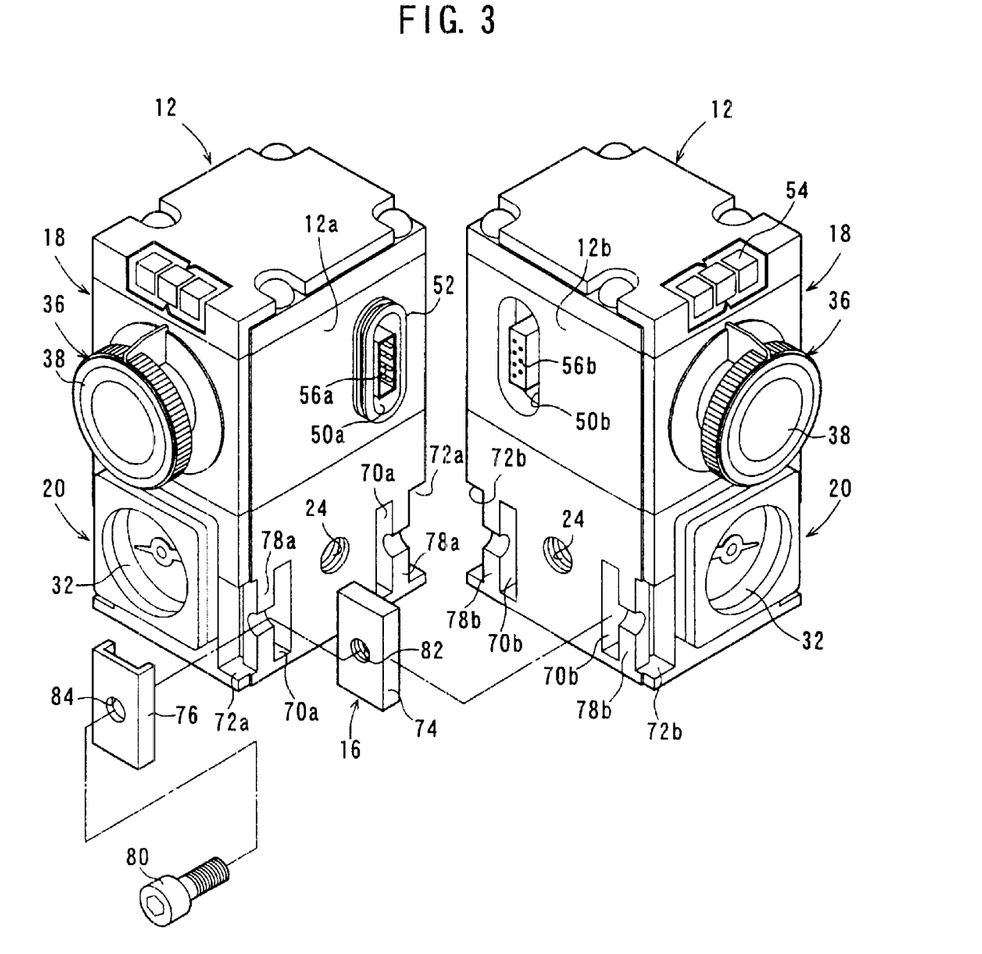
FIG. 3 is an exploded perspective view depicting pressure-detecting switches and a fixing mechanism of the position-detecting apparatus.
Figure 4:
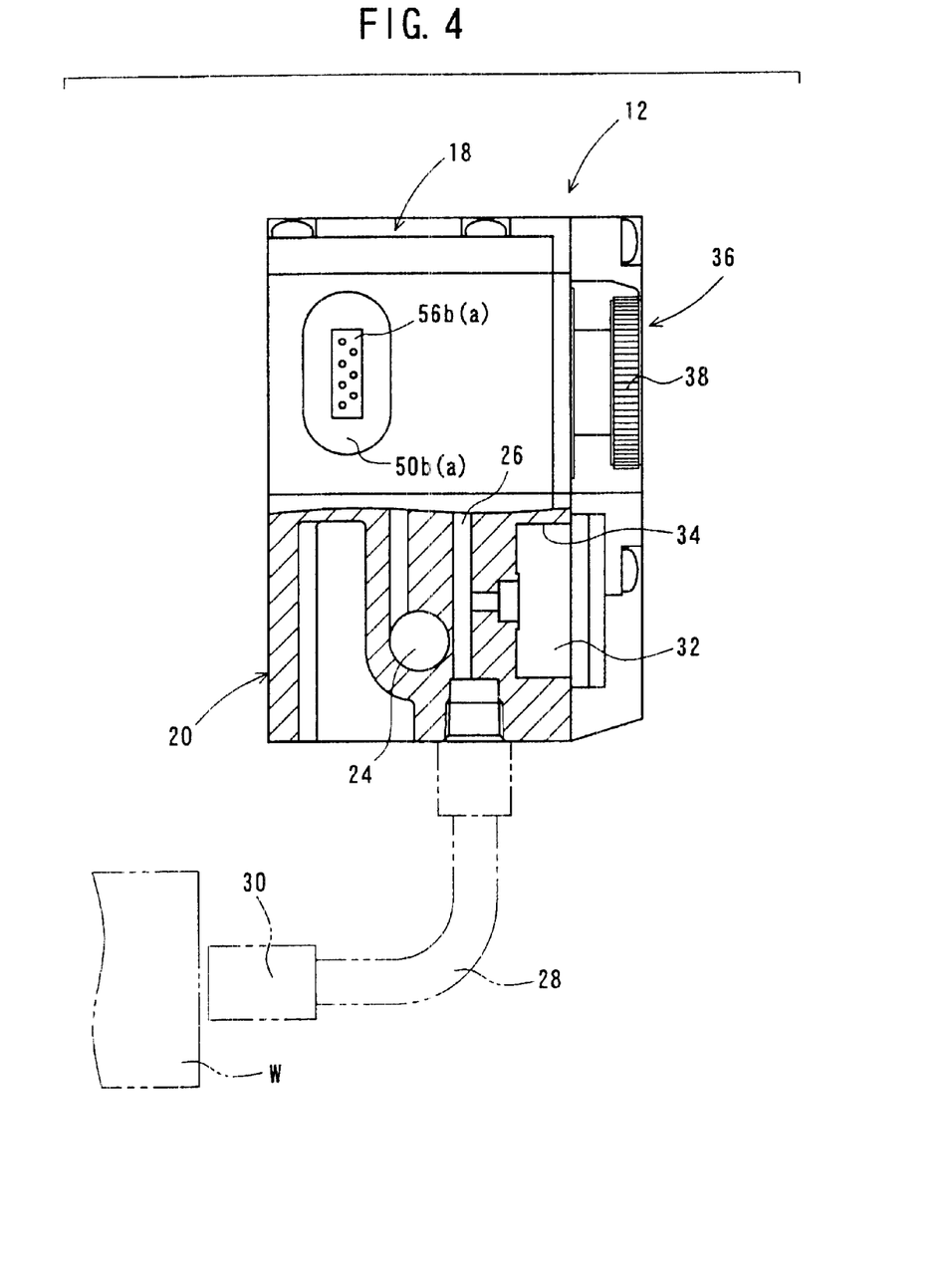
FIG. 4 shows, with partial cross section, the pressure-detecting switch.

As shown in FIG. 3, the pressure-detecting switch 12 has opening 50a, 50b which are formed at a side section 12a at one end and at a side section 12b at the other end in the connecting direction of the casing section 18 respectively. The pressure-detecting switch 12 has a projection 52 which is formed at the side section 12a and which is to be fitted to the opening 50b.

First connectors 56a, 56b, which are provided for electrical wiring, for example, for the semiconductor pressure sensor 40 and a level display section 54 for displaying the pressure state with a plurality of different light emissions (as described later on) for constructing the pressure-detecting switch 12 respectively, are arranged in the openings 50a, 50b, The first connectors 56a, 56b of the pressure-detecting switches 12 to be connected are connectable to one another. Specifically, the first electrical connectors 56a, 56b are disposed respectively on the side sections 12a, 12b of the respective adjacent pressure-detecting switches 12. As shown in FIG. 3, the first electrical connectors are made up of terminal pins and pin-receiving sockets, respectively, which come into contact for making an electrical connection when the side sections 12a, 12b are attached. A plug 58 may be detachably installed to the opening 50b, if necessary (see FIG. 2).

The terminal board box 14 comprises, at side sections 14a, 14b to which the pressure-detecting switch 12 is connectable, a second connector 60a for electric wiring to which the first connector 56a is connected, and a second connector 60b for electric wiring to which the first connector 56b is connected. The second connectors 60a, 60b are connected to a lead wire 62. The lead wire 62 is connected, for example, to an unillustrated controller.

As shown in FIG. 3, the fixing mechanism 16 comprises a pair of first recesses 70a, 70b which are formed at the side sections 12a, 12b on the sides of the passage blocks 20 as the respective connecting surfaces of the pressure-detecting switches 12 to be connected, a pair of second recesses 72a, 72b each of which is provided separately outwardly from the first recess 70a, 70b by a predetermined spacing distance, a first fixing fixture 74 which is integrally inserted into the mutually opposing first recesses 70a, 70b respectively, a second fixing fixture 76 which is integrally inserted into the mutually opposing second recesses 72a, 72b respectively, and a set screw 80 which integrally tightens and fixes the first and second fixing fixtures 74, 76 with partial projections 78a, 78b provided between the first and second recesses 70a, 72a, 70b, 72b.

A screw hole 82 is provided through the first fixing fixture 74. A hole 84 is formed through the second fixing fixture 76. When the set screw 80 is screwed into the screw hole 82, the first fixing fixture 74 and the second fixing fixture 76 are tightened. Thus, the two pressure-detecting switches 12, which are connected to one another, are fixed and integrated into one unit.

The operation of the position-detecting apparatus 10 constructed as described above will be explained below.

Figure 2:
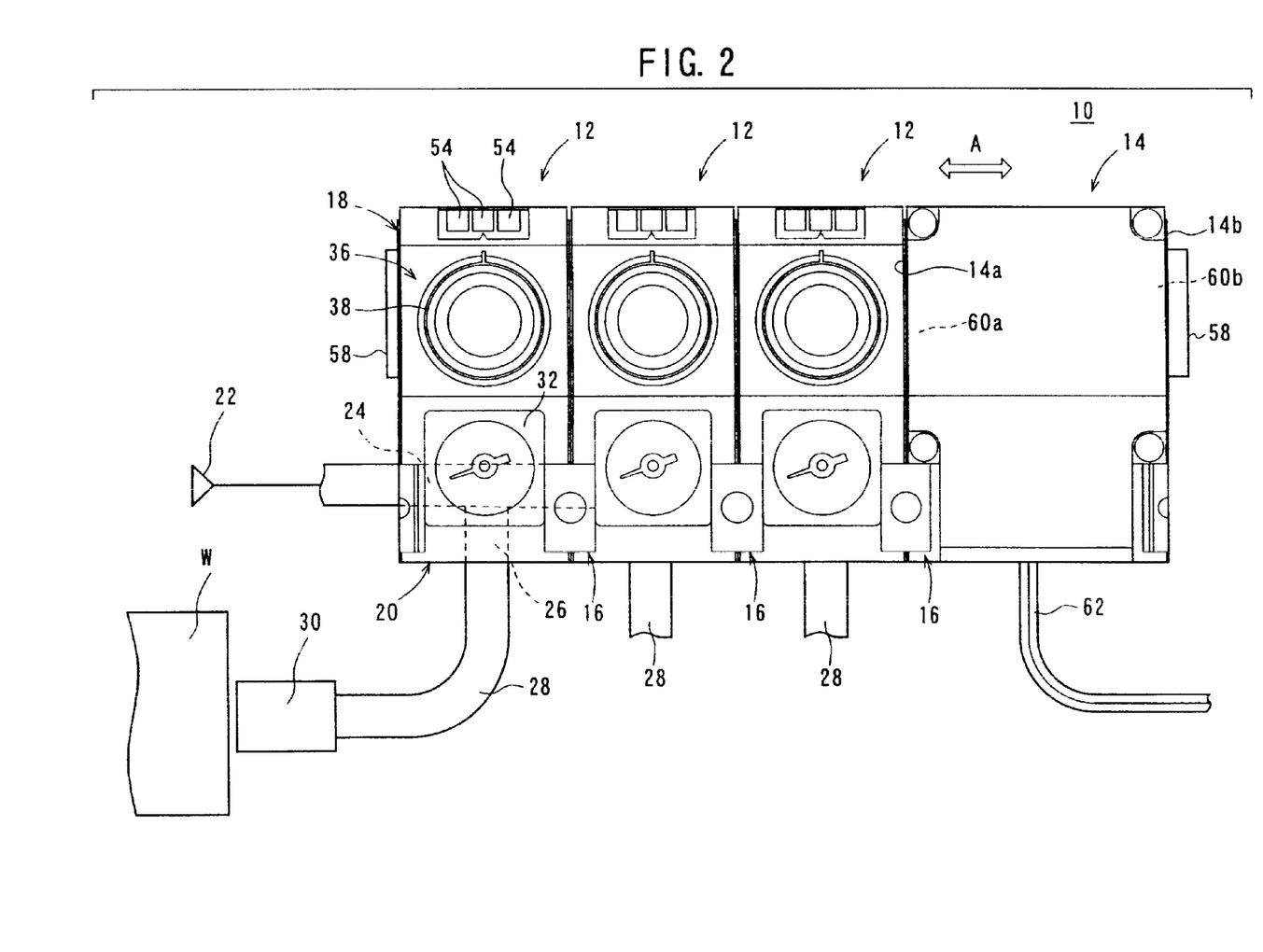
FIG. 2 is a front view illustrating the position-detecting apparatus.

As shown in FIG. 2, when the air is supplied from the air supply source 22 to the supply passage 24 of the pressure-detecting switch 12, then a part of the air is fed to the detecting nozzle 30 from the detecting fluid passage 26 via the tube 28, and the part of the air is jetted from the forward end of the detecting nozzle 30 against the workpiece W. Accordingly, the nozzle back pressure, which corresponds to the spacing distance between the detecting nozzle 30 and the workpiece W, is obtained. The nozzle back pressure is introduced into the semiconductor pressure sensor 40.

On the other hand, as shown in FIG. 5, another part of the air supplied to the supply passage 24 is supplied via the comparing fluid passage 27 to the prescribed pressure-setting section 36. The prescribed pressure is introduced into the semiconductor pressure sensor 40 from the prescribed pressure-setting section 36. The prescribed pressure is set previously by operating the setting handle 38.

Accordingly, the nozzle back pressure, which is generated by jetting the air from the detecting nozzle 30 toward the workpiece W, is compared in the pressure-detecting switch 12 with the prescribed pressure which is generated in the prescribed pressure-setting section 36. When the nozzle back pressure arrives at the prescribed pressure, it is detected that the workpiece W is correctly seated on the predetermined seat surface. In this process, the difference between the nozzle back pressure and the prescribed pressure set by the setting handle 38 can be displayed step by step with a plurality of different light emissions on the level display section 54.

Similarly, the air is supplied via the manifolded supply passage 24 to the respective pressure-detecting switches 12 which are connected in the direction of the arrow A. The operation for detecting the position is performed by utilizing the nozzle back pressure in the same manner as in the operation for confirming the seating of the workpiece W as described above.

Next, explanation will be made for the operation for attaching/detaching the pressure-detecting switch 12 of the position-detecting apparatus 10.

When the pressure-detecting switches 12 are connected to one another, then the first fixing fixture 74 is integrally inserted into the first recesses 70a, 70b which are formed at the side sections 12a, 12b as the mutual connecting surfaces, and the second fixing fixture 76 is integrally inserted into the second recesses 72a, 72b. Further, the set screw 80 is fitted and inserted through the hole 84 of the second fixing fixture 76, and it is screwed into the screw hole 82 of the first fixing fixture 74. Thus, the two pressure-detecting switches 12 are mutually fixed tightly and reliably by using the fixing mechanism 16.

On the other hand, the following operation is performed for the casing sections 18. That is, the projection 52, which is formed for the side section 12a, is inserted into the opening 50b formed for the side section 12b. Further, the first connector 56a is connected to the first connector 56b. Accordingly, the electric wiring is made for the two pressure-detecting switches 12.

Similarly, a predetermined number of, for example, three of the pressure-detecting switches 12 are connected to one another in the direction of the arrow A. Further, the terminal board box 14 is connected to the side section 12a of the pressure-detecting switch 12 which is disposed on one end side. During this operation, the first connector 56a, which is provided for the side section 12a of the pressure-detecting switch 12, is connected to the second connector 60a which is provided for the terminal board box 14. The electric wirings of the three pressure-detecting switches 12 are collected in the terminal board box 14, which are connected to the unillustrated controller via the lead wire 62.

When the pressure-detecting switch 12 is detached, then the set screw 80 of the fixing mechanism 16 is loosened, and the set screw 80 is disengaged from the first fixing fixture 74 to disable the fastening action having been effected by the fixing mechanism 16. Subsequently, the pressure-detecting switch 12 is separated from the other pressure-detecting switch 12 having been connected thereto. Therefore, the first connectors 56a, 56b, which are provided for the side sections 12a, 12b respectively, are disengaged from each other, and the pressure-detecting switches 12 are separated from each other.

As described above, in the embodiment of the present invention, when the pressure-detecting switches 12 are mutually attached/detached for the electric wiring, it is enough that only the first connectors 56a, 56b, which are arranged in the openings 50a, 50b formed through the respective side sections 12a, 12b, are mutually attached/detached. Accordingly, the electric wiring for the pressure-detecting switch 12 can be dealt with easily and quickly at once, for example, as compared with the conventional structure in which the lead wires for the respective pressure-detecting switches 12 are drawn into the terminal board box 14 via the interior of the adjoining pressure-detecting switches 12.

Further, when the pressure-detecting switch 12 is newly connected to the three pressure-detecting switches 12 having been connected to one another, it is enough to perform the following operation. That is, the new pressure-detecting switch 12 is fixed to the pressure-detecting switch 12 which is arranged on the side opposite to the terminal board box 14 by using the fixing mechanism 16, and the respective first connectors 56a, 56b are connected to one another.

On the other hand, when one pressure-detecting switch 12 is disassembled from the position-detecting apparatus 10, the electric wiring can be detached by only detaching the pressure-detecting switch 12 from the other pressure-detecting switch 12 after disenabling the fixing action having been effected by the fixing mechanism 16.

In the case of the conventional structure in which the lead wires are provided for the respective pressure 10; detecting switches 12, it is necessary to perform the attaching/detaching operation for the other pressure-detecting switch 12 connected to the terminal board box 14 in addition to the operation for the pressure-detecting switch 12 to be assembled or disassembled. In this case, the operation is considerably complicated. On the contrary, in the embodiment of the present invention, the assembling/disassembling operation for the pressure-detecting switch 12 is performed easily in a short period of time.

Further, in the embodiment of the present invention, the second connectors 60a, 60b are provided at both side sections 14a, 14b of the terminal board box 14. Accordingly, the pressure-detecting switches 12 can be connected to both sides of the terminal board box 14. The terminal board box 14 can be arranged at an arbitrary position with ease. Therefore, the degree of freedom of the installation of the position-detecting apparatus 10 is effectively improved. Further, the air supply pressure can be individually fed to the respective pressure-detecting switches 12 connected to both sides of the terminal board box 14.

In the embodiment of the present invention, the pressure-detecting switches 12 are tightened and fixed at the side sections 12a, 12b of the respective pressure-detecting switches 12 by using the first fixing fixture 74, the second fixing fixture 76, and the set screw 80 which constitute the fixing mechanism 16. Accordingly, the action for attaching/detaching the pressure-detecting switch 12 is effectively simplified, for example, as compared with the conventional structure in which the side sections 12a, 12b of the respective pressure-detecting switches 12 are fixed by the connecting through bolts.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A position-detecting apparatus comprising:
   a plurality of pressure-detecting switches each having a detecting nozzle for jetting a fluid to an object, said fluid being supplied from a fluid supply source to a detecting passage, and controlling a flow rate of a fluid supplied from said fluid supply source to a comparing passage, thereby detecting whether or not a pressure in said detecting passage arrives at a prescribed pressure in said comparing passage, wherein each of said pressure-detecting switches comprises a pair of side sections;
   a terminal board box having at least one side section for connecting to one of said pair of side sections of one of said pressure-detecting switches; and
   a fixing mechanism connecting said pressure-detecting switches to one another by using fixing members disposed in side sections of respective adjacent pressure-detecting switches, said side sections of the respective adjacent pressure-detecting switches being connected to one another,
   wherein said respective adjacent pressure-detecting switches have first electrical connectors for electric wiring disposed respectively on said side sections of the respective adjacent pressure-detecting switches, said first electrical connectors comprising terminal pins and pin-receiving sockets coming into contact and being electrically connected to one another when said side sections of the respective adjacent pressure-detecting switches are connected to one another, wherein said terminal board box has at least one second electrical connector for electric wiring disposed on said at least one side section thereof, said second electrical connector coming into contact and being electrically connected to one of said first electrical connectors when said at least one side section is connected to one of said pair of side sections of one of said pressure-detecting switches.

2. The position-detecting apparatus according to claim 1, wherein:

said side sections of the respective adjacent pressure-detecting switches have openings respectively, said first electrical connectors being disposed in said openings respectively; and wherein one of said side sections of the respective adjacent pressure-detecting switches comprises a projection, said projection being inserted and fitted into the opening of another of said side sections of the respective adjacent pressure-detecting switches.

3. The position-detecting apparatus according to claim 1, wherein said fixing mechanism comprises:

mutually opposing first recesses formed in said side sections of the respective adjacent pressure-detecting switches mutually opposing second recesses formed in said side sections of the respective adjacent pressure detecting switches, said second recesses being spaced from said first recesses by a predetermined distance;

a first fixing member integrally inserted into said mutually opposing first recesses;

a second fixing member integrally inserted into said mutually opposing second recesses;

a set screw integrally tightening and fixing said first and second fixing members with partial projections disposed between said first recesses and said second recesses.

4. The position-detecting apparatus according to claim 1, wherein said second connectors for electric wiring are disposed respectively on a pair of mutually opposing side sections of said terminal board box.

5. The position-detecting apparatus according to claim 2, wherein a detachable plug is installed in at least one of said openings.

6. The position-detecting apparatus according to claim 1, wherein said pressure-detecting switch comprises a casing section and a passage block section, said passage block section have a supply passage communicating with said fluid supply source and branched into said detecting passage and said comparing passage.

* * * * *